United States Patent [19]

Nowicki

[11] Patent Number: 5,179,588
[45] Date of Patent: Jan. 12, 1993

[54] IMPROVED PAGE PARTY SYSTEM

[75] Inventor: Edmund H. Nowicki, Denver, Pa.

[73] Assignee: Gai-Tronics, Reading, Pa.

[21] Appl. No.: 738,196

[22] Filed: Jul. 30, 1991

[51] Int. Cl.⁵ .................. H04M 9/02; H04B 3/02; H04B 3/50
[52] U.S. Cl. .................. 379/170; 379/171; 379/172; 379/173; 455/46; 455/47
[58] Field of Search .......... 379/170, 171, 167, 172, 379/173; 455/114, 109, 46, 47, 48

[56] References Cited

U.S. PATENT DOCUMENTS 5,014,347  5/1991  Cox et al. ............... 455/114
5,033,080  7/1991  Deone .................... 379/170

Primary Examiner—Stafford D. Schreyer
Attorney, Agent, or Firm—Woodcock Washburn Kurtz Mackiewicz & Norris

[57] ABSTRACT

A page party system for use in industrial environments, having a plurality of stations joined by a page line and by a single party line for providing multiple full-duplex conference calls over the single party line. Multiple full-duplex conferencing is achieved by combining single sideband suppressed carrier amplitude modulation and frequency division multiplexing.

17 Claims, 8 Drawing Sheets

IMPROVED PAGE PARTY SYSTEM

FIELD OF THE INVENTION

The present invention is directed, in general, to a page party system for use in industrial environments, such as power plants, and more specifically, to a page party system having a page line and a party line for providing multiple full-duplex conference calls over a single twisted-pair without the necessity of a conference bridge or pilot tone generator.

BACKGROUND OF THE INVENTION

Page party systems for use in industrial environments, such as power plants, are generally well known in the art.

Older prior art page party systems typically include a page line and a single party line per system. The party line typically comprises a single twisted-pair. When the page line is activated, a caller may page several individuals over one or more loudspeakers located throughout the plant. The call recipients may then pick up handsets at various stations and communicate with the calling party over the single twisted-pair line at the baseband frequency (i.e. voice signals are not modulated). As other parties are paged, they, too, may pick up handsets and communicate over the same twisted-pair line, thereby creating a full-duplex conference call. Full-duplex conferencing is realized by placing the voice signals of all parties on the twisted pair via individual current sources and passively summing these currents with a terminating impedance. Summing is permissible at the baseband frequency because the voice signals are linear. However, only one conference call may be handled at a given time on such a system because only a single party line (i.e. twisted pair) connects all stations.

In certain later page party systems, multiple simultaneous conference calls are possible. In these later systems one page line is provided as in the case of the earlier systems. However, unlike earlier systems, more than one party line is provided. In other words, in these later systems, more than a single twisted pair is used to connect the various stations. In these later systems, multiple conference calls can occur simultaneously, i.e. one conference call per twisted wire pair.

It would be desirable to provide a multiple simultaneous conferencing capability to those older systems that do not already have such a capability.

Additionally, it would be desirable to provide such a capability without the necessity of recabling so as to make additional twisted pair cable runs between stations.

U.S. Pat. No. 4,847,888—Cox (the "Cox patent") is generally directed to a page party system that purportedly allows for multiple simultaneous conference calls over a single twisted pair. In fact, however, while the system of the Cox patent does permit more than one multiple party call to occur simultaneously, it does not permit true conferencing to occur. A true conference call is one in which all parties can simultaneously talk and listen to the entire conversation of all parties to the call. True conferencing is known as "full-duplex" communication with two or more parties. The system of the Cox patent does not permit full-duplex communication.

The system of the Cox patent transmits voice information in FM from station to station on a generated carrier. Thus, in the system of the Cox patent, after a party is paged, the call recipient depresses a button on his handset and a high frequency carrier signal is generated. The call recipient's voice is then frequency modulated on the carrier signal for transmission to the calling party, where it is received and demodulated. In addition to reducing noise, the modulation of voice information at higher frequencies enables the system of the Cox patent to provide more than one multiple party call to occur simultaneously over the same twisted pair. Different multiple party calls may simultaneously take place on the same twisted-pair as long as each multiple party call uses a different carrier frequency to transmit voice information. The carrier frequencies are selected such that the different multiple party calls occupy adjacent, non-overlapping frequency bands on the single twisted-pair. This technique, called frequency division multiplexing (FDM), is well known to those skilled in the art.

True conferencing is achieved in older page party systems by simultaneously placing the baseband voice signals of each speaker on the twisted-pair via current sources and passively summing these currents with a terminating impedance. Summing is possible because the voice signals at the baseband frequency are linear signals. The system of the Cox patent, however, is incapable of true conferencing because frequency modulated carriers, such as those used in the Cox system, are non-linear and cannot be summed. As a result, at a given carrier frequency, only one modulated carrier signal (i.e. one speaker) can be transmitted at a time. In this regard the device of the Cox patent operates somewhat in the manner of a "walki-talki." While all parties to a particular conference call may listen to a speaker, only one person may speak at a time. Therefore, although the Cox patent describes a purported multiple conference call capability, true conferencing is not permitted with the system of that patent.

In order to provide true conferencing in the system of the Cox patent, a conference bridge might conceivably be employed. With a conference bridge, however, each speaker is connected to a central point, or "bridge" via his own twisted-pair line. At the conference bridge, the frequency modulated carrier signals of each speaker are demodulated, thus reproducing the voice information of each speaker at the baseband frequency. These baseband voice signals are then summed and remodulated on a single carrier for transmission to each station over an existing single twisted-pair. While such an approach would allow for full-duplex communication, two significant drawbacks would be introduced by such a system. First, each speaker must be connected to a conference bridge, and therefore, if the conference bridge fails, the whole system fails. Second, each speaker in the conference occupies a unique channel. Consequently, the number of channels available is directly proportional to the number of people in the conference.

It would be desirable, therefore, to provide a page party system that provides for simultaneous, multiple, full-duplex conference calls over an existing single twisted-pair, without the necessity of a conference bridge. The page party system of the present invention achieves the foregoing object.

SUMMARY OF THE INVENTION

A page party communication system having a plurality of stations joined by a page line and by a single twisted-pair party line for providing plural full duplex voice conferencing channels on the single party line.

Each station of the page party system of the present invention includes a current source line driver selectively coupled to either the page line for transmitting a paging message to the page line or to the party line for transmitting outgoing or receiving incoming voice signals over the party line. Each station also includes a channel selector switch for selecting one of the conferencing channels, each of the conferencing channels having a unique frequency band corresponding thereto. Each station further includes an audio input means for receiving outgoing voice signals and a voice modem means, responsive to the audio input means. The voice modem includes means for amplitude modulating a carrier with the outgoing voice signal and for suppressing the carrier and one its sidebands to produce a single sideband suppressed carrier spectrum. The voice modem at each station also includes means for translating that spectrum to the frequency band of a selected conferencing channel. The voice modem further includes means, responsive to the line driver, for receiving single sideband suppressed carrier spectra representing incoming voice signals from other stations on the party line and for translating incoming spectra located at the frequency of the selected channel to baseband. Lastly, the voice modem includes means for suppressing sidetone from incoming voice signals to produce a suppressed sidetone output signal. Each station further includes a means, coupled to the voice modem, for generating an audio output in response to the suppressed sidetone output signal.

Unlike the Cox system, the present invention modulates the voice information of each speaker in a particular conference call using single sideband, suppressed carrier amplitude modulation, rather than frequency modulation. Amplitude modulated signals are linear, and therefore, modulated carriers of a same channel frequency can be summed. The passive summation of carrier signals at a given conferencing channel frequency provides full-duplex communication over that conferencing channel. Additionally, multiple conference calls simultaneously may take place over the same party line by utilizing a different conference frequency for each call. Thus, the page party system of the present invention provides for simultaneous, multiple, full-duplex conference calls over an existing single twisted-pair, without the necessity of a conference bridge, by combining frequency division multiplexing with single sideband, suppressed carrier amplitude modulation of voice information.

Furthermore, with single sideband, suppressed carrier amplitude modulation, the present invention permits the use of a non-coherent demodulator at the receiving end. Other forms of amplitude modulation, such as double sideband modulation, require coherent demodulation. Typically, in order to provide the necessary phase coherence between transmitting and receiving stations, a "pilot signal" is transmitted throughout the system to provide synchronization. The pilot signal generator is usually located centrally within the communication system, and failure of the generator will disable the entire system. The non-coherent demodulators of the present invention obviate the need for a pilot generator, thereby reducing the risk of general system failure.

In carrying out the present invention, digital signal processing techniques are employed in order to implement the single sideband, suppressed carrier amplitude modulator.

BRIEF DESCRIPTION OF THE DRAWING

The present invention will be more fully understood by reference to the accompanying drawings in which.

DETAILED DESCRIPTION OF THE PREFERRED EMBODIMENT

Figure 1:
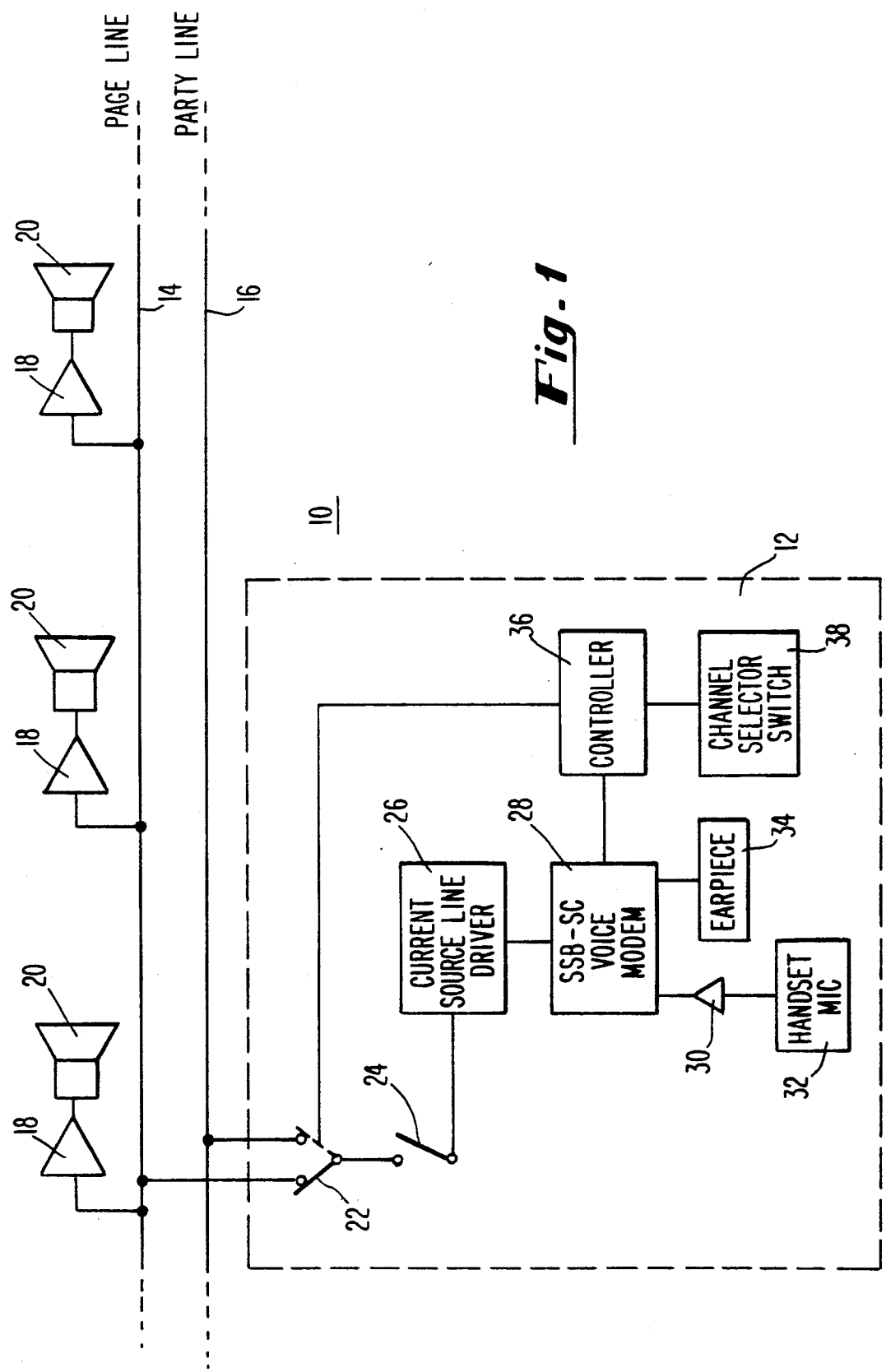
FIG. 1 is a block diagram of the page party system of the present invention showing a plurality of stations coupled to a single page line and a single party line.

Referring to the drawings in detail, wherein like numerals indicate like elements throughout, there is shown in FIG. 1 the improved page party system of the present invention, the system being shown generally at 10. The system 10 is useful in factories, mines, power plants, etc. for the transmission of paging messages and for intra-plant communications. The system includes a plurality of stations 12. Each station 12 is coupled to a single page line 14 and to a single party line 16. The page line 14 is used for transmitting a paging message and the party line 16 is used for providing a voice communication path between each of the stations 12 and each of the other stations and also for providing plural full duplex voice conferencing channels.

The page line 14 is coupled to one or more paging amplifiers 18 which, in turn, are coupled to a plurality of paging speakers 20.

Each station 12 is selectively coupled to either the page line 14 or to the party line 16 depending upon the position of switch 22. The switch 22 may take the form of a press bar located at the telephone handset at each station 12. In addition, each station 12 includes a hook switch 24 which is open when the telephone handset at that station is on hook.

In addition to the press bar switch 22 and the hook switch 24, each station 12 includes a current source line driver 26 for transmitting a paging message to the page line 14 or for transmitting outgoing voice signals to the party line 16. Each station 12 also includes a voice modem 28. The voice modem is coupled to an input amplifier 30 and an audio input means for receiving outgoing voice signals for transmission across the party line 16. The audio input means is shown as a handset microphone 32 in FIG. 1. The voice modem 28 is also coupled to a means for generating an audio output, shown in FIG. 1 as an earpiece 34. The voice modem 28 is responsive to a controller 36. The controller 36 is coupled to and responsive to the press bar switch 22 and to a channel selector switch 38. The channel selector switch 38 may be set by the operator to identify which of a plurality of conferencing channels are to be employed. The controller 36 generates a channel selector signal that uniquely identifies the selected conferencing channel and directs that signal to the voice modem 28 as will be further described below.

Figure 2:
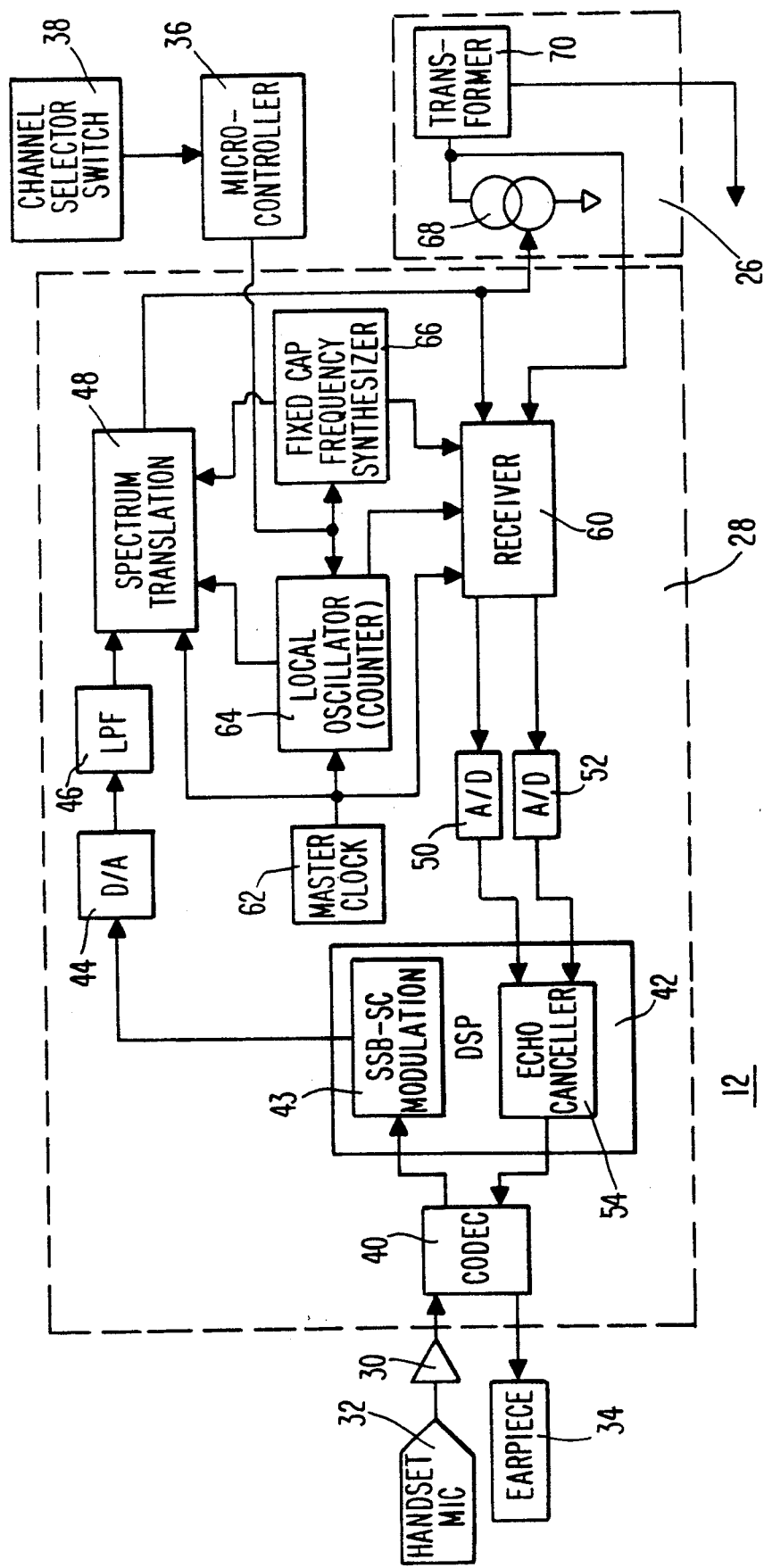
FIG. 2 is a block diagram of one station of the page party system of FIG. 1.

Referring now to FIG. 2, there is shown a more detailed block diagram of one of the stations 12 of the system 10. The voice modem 28 comprises a CODEC 40 coupled to the input amplifier 30 for receiving an outgoing voice signal and for sampling the voice signal at a predetermined rate. In the preferred embodiment, the CODEC 40 samples the voice signal at a rate of 8k samples/sec. The CODEC 40 is of a type well known to those skilled in the art, and therefore, further description of the CODEC 40 is neither necessary nor limiting. A digital signal processor (DSP) 42 is coupled to the CODEC 40 for receiving the sampled voice signal from the CODEC 40. The DSP 42 includes means 43 for amplitude modulating a carrier signal with the outgoing voice signal and for suppressing the carrier and one of its sidebands to produce a single sideband suppressed carrier (SSB-SC) spectrum.

Figure 3A:
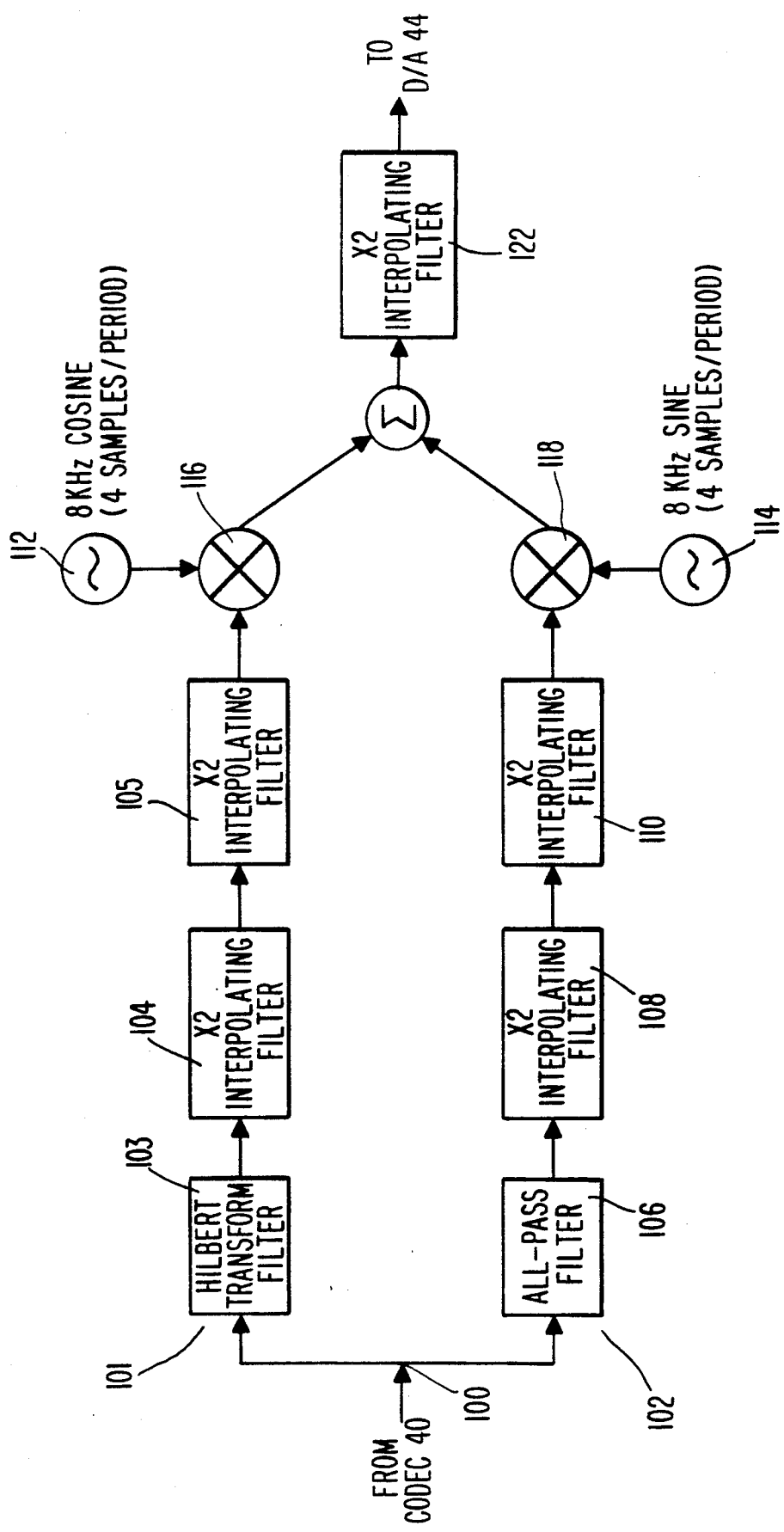
FIG. 3a is a block diagram of the modulation means of the digital signal processor of the station shown in FIG. 2.
Figure 3B:
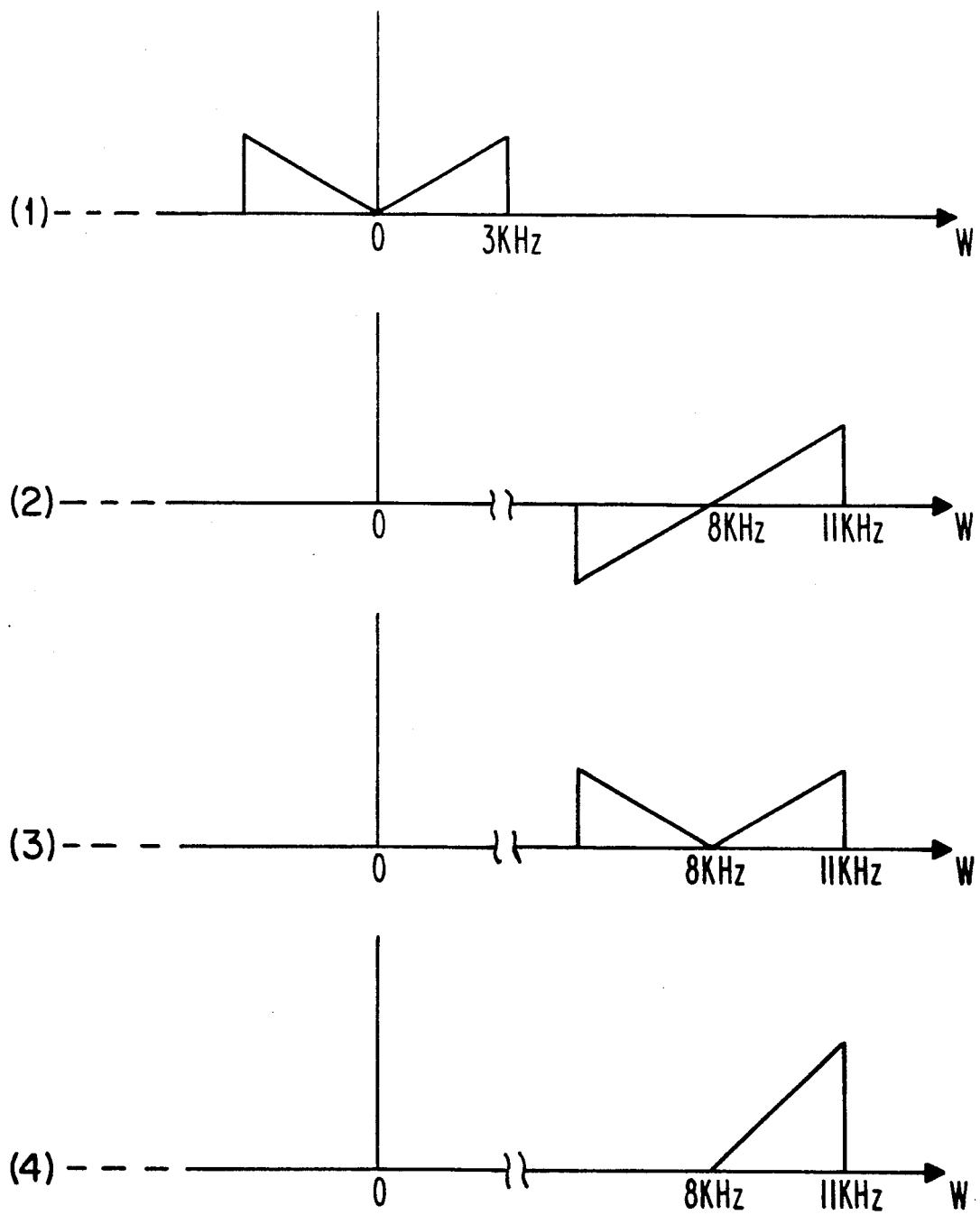
FIG. 3b illustrates graphically the signals produced by the modulation means shown in FIG. 3a to achieve single sideband suppressed carrier amplitude modulation.

Referring now to FIGS. 3a and 3b, the modulation means 43 of the DSP 42 is shown in greater detail. The modulation means 43 is coupled to the CODEC 40 for receiving the sampled outgoing voice signal from the CODEC 40. As received, the frequency spectrum of the voice signal is at baseband and is illustrated graphically in FIG. 3b(1). As shown in FIG. 3a, the modulation means 43 includes a means for splitting the outgoing voice signal into identical first and second voice signals, shown generally in FIG. 3a as a signal splitter 100 which creates a first branch 101 and a second branch 102, each branch simultaneously receiving the first and second voice signals respectively. The frequency spectrum of the first and second voice signals are identical to the spectrum illustrated in FIG. 3b(1).

The first circuit branch 101 of the modulation means 43 includes a means for phase-shifting the first voice signal. In the preferred embodiment, the means for phase-shifting is a Hilbert transform filter 103 which phase-shifts the first voice signal 90 degrees. The first branch 101 further includes a first x2 interpolating filter 104 and a second x2 interpolating filter 105 coupled in series to the Hilbert transform filter 103. The x2 interpolating filters 104, 105 each effectively double the sampling rate of the phase-shifted baseband voice signal.

The first branch 101 of the modulation means 43 also includes a modulator 116 coupled to the second interpolating filter 105 for modulating a cosine-wave carrier signal having a selected frequency with the phase-shifted voice signal. The cosine-wave carrier is generated by an oscillator 112 which is coupled to the modulator 116 and which, in the preferred embodiment, produces a discrete time 8 kHz cosine-wave carrier having 4 samples/period. The frequency spectrum of the resulting modulated cosine-wave carrier is centered at the carrier frequency and has a lower sideband and an upper sideband, each sideband being a representation of the baseband voice signal. The magnitudes of the two sidebands have opposite polarity as a result of the phase-shift performed prior to modulating. The spectrum of the modulated cosine-wave carrier is illustrated graphically in FIG. 3b(2).

The second branch 102 of the modulation means 43 includes an all-pass filter 106 which matches the delay of the Hilbert transform filter 103 and allows the second voice signal to pass therethrough without changing the phase of the signal. Thus, while the baseband voice signal propagating through the first branch 101 is phase-shifted 90 degrees, the voice signal propagating through the second branch 102 is essentially the original baseband voice signal. The signal delay characteristics of the all-pass filter 106 match the delay characteristics of the Hilbert transform filter 103 of the first branch 101 so that the voice signals propagating through each branch remain in quadrature. As with the first branch 101, the second branch 102 further includes a first x2 interpolating filter 108 and a second x2 interpolating filter 110 coupled in series to the all-pass filter 106. The x2 interpolating filters 108, 110 each effectively double the sampling rate of the second voice signal.

The second branch 102 of the modulation means 43 also includes a modulator 118 coupled to the second interpolating filter 110 for modulating a sine-wave carrier signal having a selected frequency with the second voice signal. The sine-wave carrier is generated by an oscillator 114 which is coupled to the modulator 118 and which, in the preferred embodiment, produces a discrete time 8 kHz sine-wave carrier having 4 samples/period. The frequency spectrum of the resulting modulated sine-wave carrier is centered at the carrier frequency and has a lower sideband and an upper sideband, each sideband being a representation of the baseband voice signal. Because the second voice signal was not phase shifted, the magnitudes of the two sidebands have the same polarity. The spectrum of the modulated sine-wave carrier is illustrated graphically in FIG. 3b(3).

Still referring to FIG. 3a, the modulation means 43 further includes a means coupled to each modulator 116, 118 for summing the modulated carrier signals. In the preferred embodiment, the means for summing is a signal summer 120 of type well known to those skilled in the art. Because the sidebands of the modulated cosine-wave carrier are of opposite polarity and the sidebands of the modulated sine-wave carrier are of equal polarity, at least one of the sidebands of the modulated cosine-wave carrier will cancel with the corresponding sideband of the modulated sine-wave carrier thereby producing a single sideband suppressed carrier (SSB-SC) spectrum located at the selected frequency. The single sideband suppressed carrier spectrum produced by the summation is illustrated graphically in FIG. 3b(4).

A final x2 interpolating filter 122 is coupled to the summer 120 for again effectively doubling the sampling rate of the SSB-SC voice signal.

It is understood by those skilled in the art that, in the preferred embodiment, the DSP 42 provides a software implementation of the modulation means 43 shown in FIG. 3a, and does not actually comprise the discrete circuitry shown in the Figure. However, a description of the circuitry of FIG. 3a best illustrates the functionality of the software implementation. Furthermore, it is understood by those skilled in the art that discrete circuitry, such as that shown in FIG. 3a, could be employed instead of the DSP 42 without deviating from the spirit and scope of the present invention.

Additionally, although in the preferred embodiment, the modulation means 43 employs a phase-shift technique to obtain the single sideband, suppressed carrier spectrum, other techniques could be employed. For example, a "filter" technique such as that described in Siebert, *Circuit, Signals, and Systems*, 523-27 (1986), could be employed. Briefly, the "filter" technique (not shown) is accomplished by multiplying the baseband voice spectrum with an Intermediate Frequency carrier and using a high Q filter to reject all but the desired sideband.

Referring again to FIG. 2, the voice modem 28 further includes a Digital-to-Analog converter (D/A) 44 coupled to the DSP 42 for converting the sampled SSB-SC voice signal produced by the modulation means 43 from its sampled form back to analog form. A reconstruction filter 46 is coupled to the D/A converter 44 for removing periodic extensions of the digital signal. The voice modem 28 also includes a means 48 coupled to the LPF 46 for translating the SSB-SC signal spectrum to the frequency band of a selected conferencing channel. The translating means is described hereinafter in greater detail.

Still referring to FIG. 2, the voice modem 28 also includes a master clock 62 for generating a master clock signal at the station 12. The master clock 62 is non-synchronous with respect to the master clocks at each other station 12. In the preferred embodiment, the master clock oscillates at 10.24 MHz, however it is understood by those skilled in the art that any suitable frequency could be used.

The voice modem 28 further includes a means responsive to the channel selector signal and to the master clock signal for generating a local oscillator signal, the frequency of which varies depending upon the conferencing channel selected. The means for generating a local oscillator is shown in FIG. 2 as a counter 64 and is coupled to the master clock 62 and the controller 36.

Also, the voice modem 28 includes a means for determining the cut-off frequency of several tracking low pass filters (described hereinafter) depending upon the conferencing channel being selected. The means for determining the cut-off frequency is shown in the Figure as a fixed cap frequency synthesizer 66. The synthesizer 66 is coupled to the controller 36 and responsive to the channel selector signal.

As best shown in FIG. 2, the translating means 48 is coupled to and responsive to the master clock 62, the counter 64 and the synthesizer 66.

Figure 4:
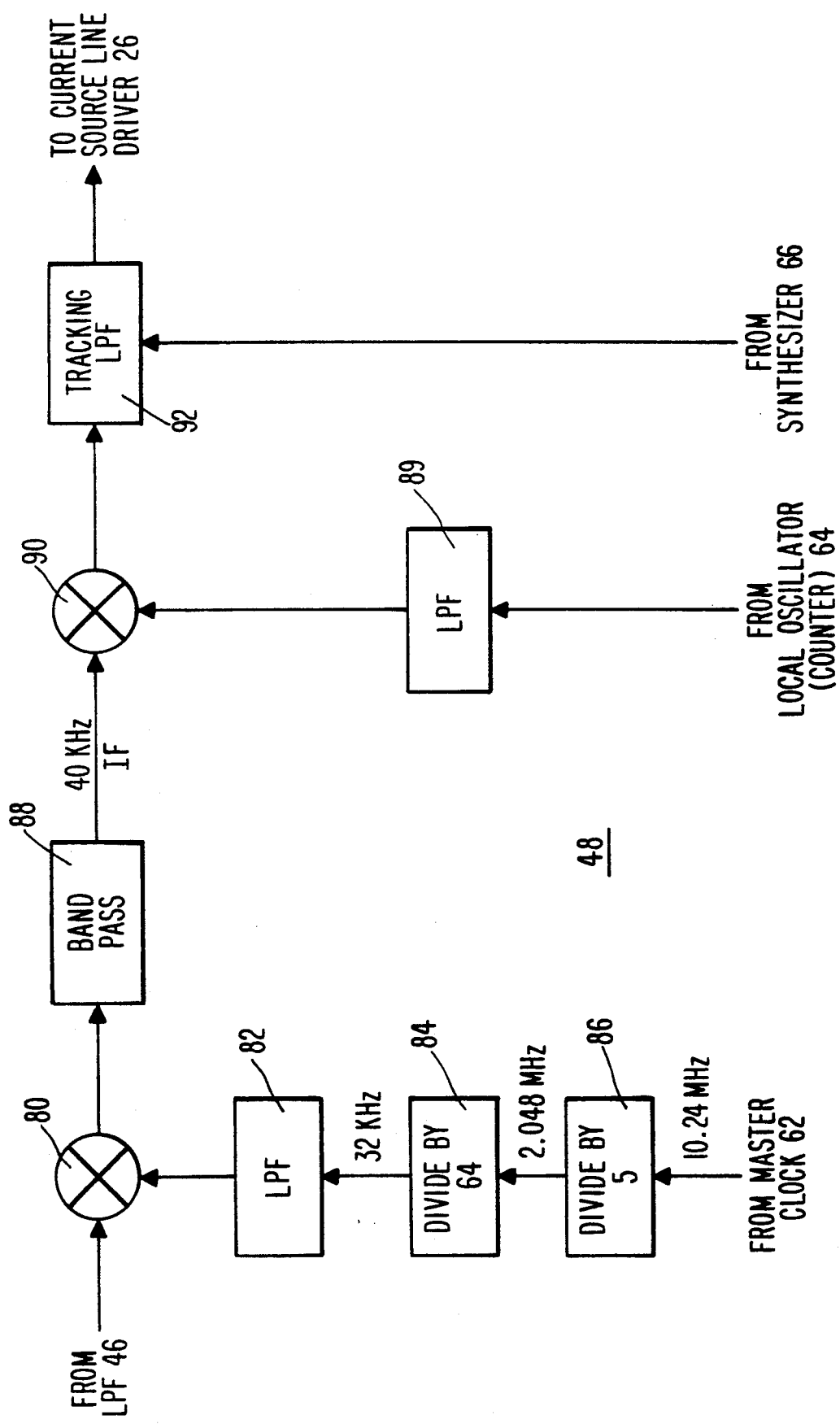
FIG. 4 is a block diagram of the translating means of the station shown in FIG. 2.

Referring now to FIG. 4, the translating means 48 is shown in greater detail. The translating means 48 translates the SSB-SC voice signal spectrum to the frequency band of a selected conferencing channel. In the preferred embodiment, however, the SSB-SC voice signal spectrum is first shifted to an intermediate frequency band. Thus, the translating means includes a means for shifting the SSB-SC voice spectrum to an intermediate frequency. In the preferred embodiment, the intermediate frequency is 40 kHz, however, any suitable intermediate frequency could be used.

The means for shifting the SSB-SC voice signal spectrum to the intermediate frequency comprises a divide-by-5 circuit 86 coupled to the master clock 62 for receiving the master clock signal from the master clock 62 and reducing the frequency of the master clock signal by a factor of five. A divide-by-64 circuit 84 is coupled to the divide-by-5 circuit 86 for further reducing the frequency of the carrier by a factor of 64 to produce a reduced frequency carrier. A low pass filter (LPF) 82 is coupled to the divide-by-64 circuit 84 for filtering high order harmonics. In the preferred embodiment, where the master clock signal oscillates at 10.24 MHz, the divide by circuitry 84, 86 produces a reduced frequency carrier having a frequency of 32 kHz.

The means for shifting the SSB-SC spectrum to an intermediate frequency further comprises a modulator 80 coupled to the LPF 82 and to the D/A converter 46, for modulating the SSB-SC voice signal with the reduced frequency carrier signal to produce both a lower frequency and a higher frequency image of the SSB-SC spectrum at least one of which is at the desired intermediate frequency. In the preferred embodiment where the SSB-SC voice signal is originally at 8 kHz and the reduced frequency carrier oscillates at 32 kHz, the lower frequency image of the SSB-SC voice signal is at 24 kHz, and the higher frequency image is at the desired intermediate frequency of 40 kHz. In the preferred embodiment, therefore, the higher frequency image occupies the frequency range of 40 to 43 kHz. A bandpass filter 88 is coupled to the modulator 80 for rejecting the lower frequency SSB-SC image but allowing the higher frequency SSB-SC image to pass. Thus, the SSB-SC voice spectrum originally at 8 kHz has been shifted to the desired intermediate frequency, which in the preferred embodiment is 40 kHz.

Still referring to FIG. 4, the translating means 48 further includes a means for modulating the SSB-SC spectrum at the intermediate frequency with the local oscillator signal. The means for modulating is shown in FIG. 4 as a modulator 90 coupled to the bandpass filter 88 and to a low pass filter 89 which is coupled to the counter 64 for receiving the local oscillator signal. Modulation of the SSB-SC spectrum at the intermediate frequency with the local oscillator signal again produces both a lower frequency and higher frequency image of the SSB-SC spectrum. As mentioned above, the frequency of the local oscillator signal varies depending upon the conferencing channel selected. Consequently, for a selected conferencing channel, at least one of the images of the SSB-SC spectrum produced by the modulator 90 falls within the frequency band of the selected conferencing channel.

A tracking low pass filter (LPF) 92 is coupled to the modulator 90 and to the synthesizer 66 for rejecting the image of the SSB-SC spectrum at one of the frequencies while passing the other. The cut off-frequency of the filter 92 is determined by the synthesizer 66 such that the filter 92 passes the sideband image falling within the frequency band of the selected conferencing channel. In the preferred embodiment, as described below in greater detail, the lower frequency image of the SSB-SC spectrum falls within the frequency band of the selected conferencing channel.

Figure 5:
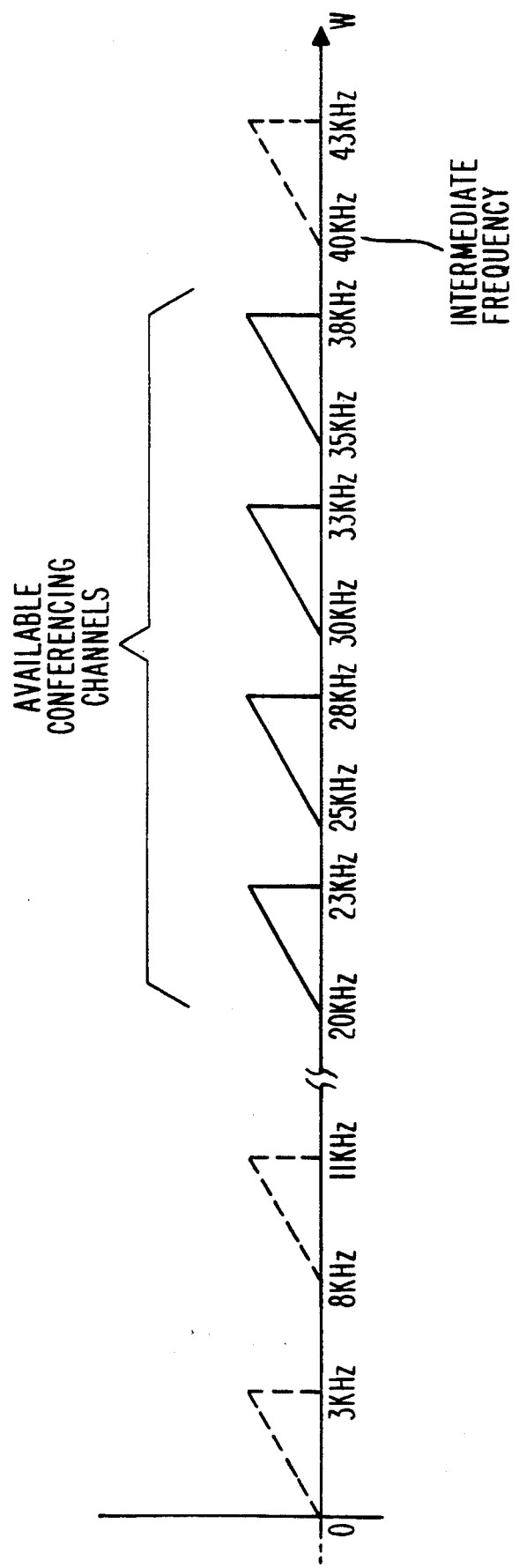
FIG. 5 illustrates graphically the frequency bands of each conferencing channel of the present invention.

In the preferred embodiment, there are four selectable conferencing channels occupying frequency bands of 20 kHz to 23 kHz, 25 kHz to 28 kHz, 30 kHz to 33 kHz and 35 kHz to 38 kHz respectively. These frequency bands are illustrated in FIG. 5 along with a dashed line representation of the original SSB-SC voice spectrum at 8 kHz and of the SSB-SC voice spectrum shifted to the intermediate 40 kHz frequency. The baseband voice spectrum, which occupies the frequency range of 0 to 3 kHz is also illustrated. As mentioned above, when the SSB-SC voice spectrum at the intermediate 40 kHz frequency is modulated with the local oscillator signal, a lower frequency and a higher frequency image of the SSB-SC voice spectrum is produced. As those skilled in the art understand, if the frequency of the local oscillator is FLO, the lower frequency image appears at FLO−40 kHz, and the higher frequency image appears at FLO+40 kHz. The counter 64, which is responsive to the channel selector signal, generates a local oscillator signal having a frequency (FLO) such that the sideband image at FLO−40 kHz falls within the frequency range of the selected conferencing channel.

Thus, for example, referring to FIG. 5, if channel 1 (20 kHz to 23 kHz) were the selected conferencing channel, the counter 64, in response to the channel selector signal from the controller 36, would generate a local oscillator with a frequency (FLO) of 60 kHz so that upon modulation with the SSB-SC voice spectrum at 40 kHz, an image of the SSB-SC voice spectrum would appear at 20 khz (FLO−40 kHz=20 kHz, when FLO=60 kHz), and would therefore occupy the frequency band of 20 to 23 kHz. An unwanted sideband image would appear at 100 kHz (FLO+40 kHz), but would be filtered by the tracking low-pass filter 92.

Thus, as the foregoing description illustrates, the translating means 48 translates the SSB-SC voice spectrum, located originally at 8 kHz, to the frequency band of the selected conferencing channel. As mentioned, in the preferred embodiment, there are four different conferencing channels available and a conferencing channel may be selected by setting the channel selector switch 38 (shown in FIG. 1) to the desired channel. Thus, the SSB-SC voice spectrum of the outgoing voice signal will be translated to one of four frequency bands depending on the conferencing channel being selected. Multiple conference calls may take place over a single party line by utilizing a different conferencing channel for each. This technique is known to those skilled in the art as frequency-division-multiplexing.

Referring back to FIGS. 1 and 2, the output of the translating means 48 is coupled to a current source line driver 26, which comprises a current source 68 and a transformer 70, for transmitting the outgoing SSB-SC voice signal over the party line 16 or over the page line 14 depending on the position of switch 22. It is understood by those skilled in the art that SSB-SC voice signals simultaneously transmitted over the party line from other stations 12 and having SSB-SC voice spectra located at the same channel frequency, will be passively summed at the channel frequency.

Referring now solely to FIG. 2, the voice modem 28 further includes a means 60, coupled to and responsive to the current source line driver 26, the counter 64, and the synthesizer 66, for receiving single sideband suppressed carrier spectra representing incoming voice signals from other stations 12 on the party line and for translating to baseband those incoming voice spectra that are located at the frequency of the selected conferencing channel. However, because the outgoing message signal at each station is passively summed with the voice signals of other stations, the incoming voice signal spectra received at a given station include the outgoing voice signal generated at that station. Thus, to prevent local echo of the outgoing voice signal, the unwanted outgoing voice signal component must be subtracted from the incoming voice signals. To this end, the receiving means 60 is additionally coupled to the translating means 48 for receiving the outgoing SSB-SC voice signal from the translating means 48 and for re-translating the outgoing SSB-SC voice spectrum back to baseband. This baseband outgoing voice spectrum is then subtracted from the incoming spectra, as described hereinafter, thus removing the unwanted component and preventing local echo.

Figure 6:
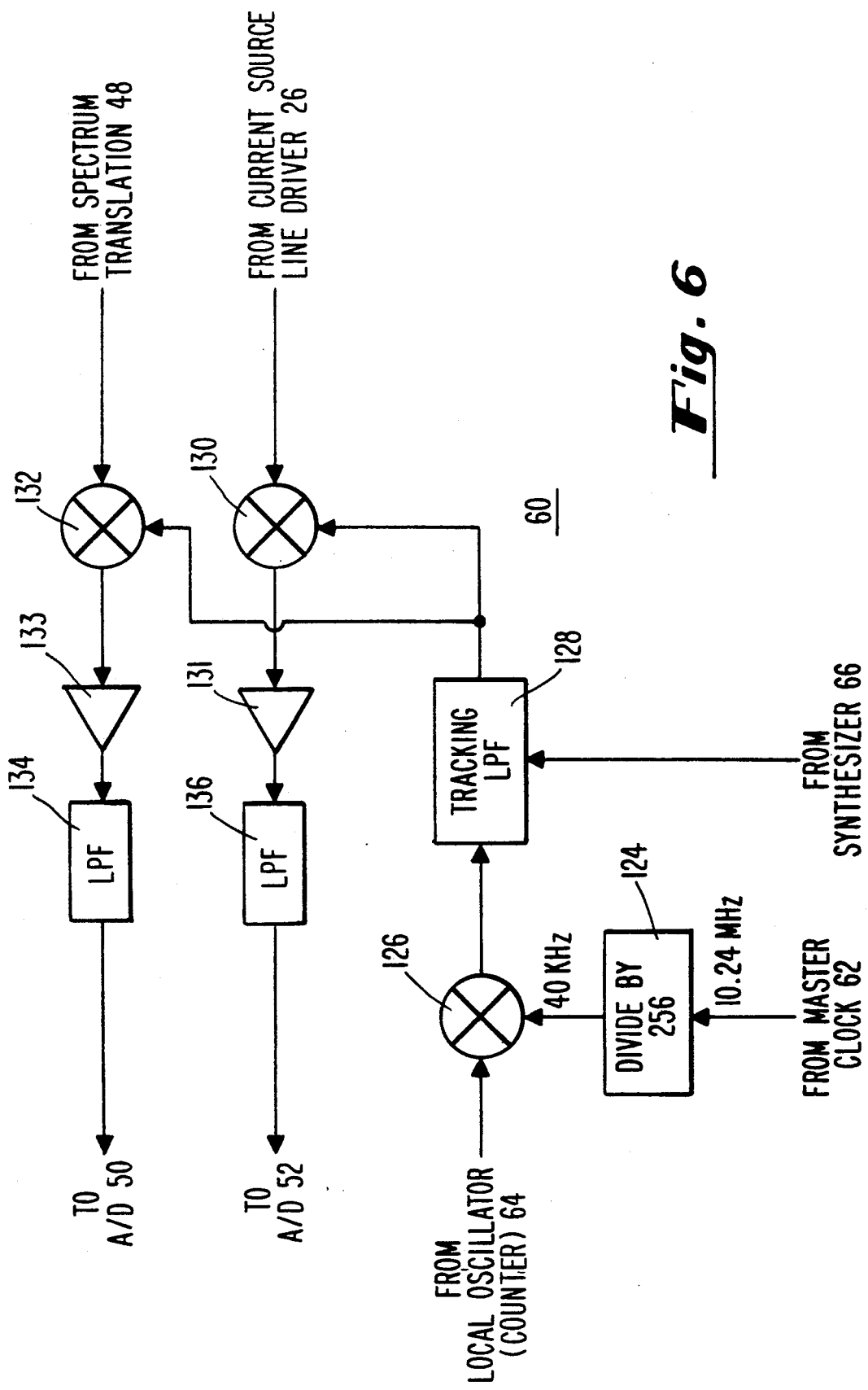
FIG. 6 is a block diagram of the receiving means of the station shown in FIG. 2.

Referring to FIG. 6, the receiving means 60 is shown in greater detail. The receiving means 60 includes a means for generating a receive local oscillator having a frequency corresponding to the selected conferencing channel. In the preferred embodiment, the means for generating a receive local oscillator comprises a divide-by-256 circuit 124, a modulator 126 and a tracking low-pass filter 128.

The divide-by-256 circuit 124 is coupled to the master clock 62 for reducing the frequency of the master clock signal to generate a carrier signal having a frequency equal to the intermediate frequency. Recall that the intermediate frequency is the frequency to which the original SSB-SC spectrum of the outgoing voice signal is shifted by the translating means 48. Thus, in the preferred embodiment, where the master clock signal oscillates at 10.24 Mhz, the divide-by-256 circuit 124 generates a 40 kHz signal (40 kHz being the intermediate frequency of the preferred embodiment).

The modulator 126 is coupled to the divide-by-256 circuit 124 and to the counter 64 for modulating the local oscillator signal, generated by the counter 64, with the carrier signal. As described above, the frequency of the local oscillator signal (FLO) varies depending upon the conferencing channel being selected. Modulation of the local oscillator with the carrier signal produces a higher frequency signal and a lower frequency signal. The lower frequency signal has a frequency of FLO—the intermediate frequency, and the upper frequency signal has a frequency of FLO+the intermediate frequency. Thus, in the preferred embodiment, where the intermediate frequency is 40 kHz, the lower frequency signal has a frequency of FLO−40 kHz. Recall from the discussion of the translating means 48 above that the frequency (FLO−40 kHz) corresponds to the selected conferencing channel.

The tracking low-pass filter 128 is coupled to the modulator 126 and the synthesizer 66 for rejecting the higher frequency signal, but allowing the lower frequency signal to pass. Thus, a receive local oscillator signal (the lower frequency signal) is generated having a frequency that corresponds to the selected conferencing channel and that can be utilized to translate the incoming voice spectra to baseband, as hereinafter described.

Referring still to FIG. 6, the receiving means further includes a modulator 130 coupled to the current source line driver and to the low-pass filter 128 for receiving SSB-SC spectra representing incoming voice signals from other stations 12 on the party line and for modulating the incoming SSB-SC voice spectra with the receive local oscillator. Modulation of the receive local oscillator, which has a frequency corresponding to the selected conferencing channel, with incoming voice spectra located at the frequency of the selected conferencing channel, produces an image of the incoming SSB-SC spectra at baseband and an image of the incoming SSB-SC spectra at twice the channel frequency. A gain stage 131 is coupled to the modulator 130 for boosting the power in the sideband images, and a low-pass filter 136 is coupled to the gain stage 131 for rejecting the image of the SSB-SC spectra at twice the channel frequency, but passing the image of the SSB-SC spectra at baseband.

Thus, the receiver means 60 translates incoming voice spectra located at the frequency of the selected channel to baseband. Because the master clock 62 of the station 12 is non-synchronous with the master clocks of other stations 12, the incoming voice spectrum is slightly skewed in frequency, due to the difference in absolute frequency of the local oscillators at each station 12. Also, as mentioned above, the incoming voice spectra include an unwanted outgoing voice signal component (because all the spectra are summed on the party line) and therefore, the outgoing voice signal component must be subtracted from the incoming signals to prevent local echo of the outgoing voice signal (i.e. suppress sidetone).

To this end, the receiving means 60 also includes a modulator 132 coupled to the low-pass filter 128 and to the translating means 48 for translating the outgoing SSB-SC voice spectrum generated by the translating means 48 back to baseband in a manner similar to the translation performed by modulator 130 on the incoming voice signals. A gain stage 133 is similarly coupled to the modulator for boosting the power in the sideband images, and a low pass filter 134 coupled to the gain stage 133 similarly filters out the unwanted higher frequency sideband image generated by the modulation, passing the baseband voice spectrum of the outgoing voice signal. This outgoing voice signal can then be subtracted from the incoming voice signals to remove the unwanted outgoing voice signal component.

As indicated in FIG. 6, but as best illustrated in FIG. 2, the voice modem 28 further includes a first analog-to-digital converter (A/D) 50 coupled to the low-pass filter 134 of the receiving means 60 and a second analog-to-digital converter (A/D) 52 coupled to the low-pass filter 136 of the receiving means 60 for converting the outgoing baseband voice signal and the incoming baseband voice signals from analog form to digital form respectively.

Referring now solely to FIG. 2, the DSP 42 of the voice modem 28 further includes a means coupled to the first and second A/D converters 50, 52 for suppressing sidetone from the incoming baseband voice signals. The means for suppressing sidetone is shown in the Figure as an echo canceller 54. The echo canceller 54 is also coupled to the earpiece 34 for producing an audio output of the incoming voice signals.

Figure 7:
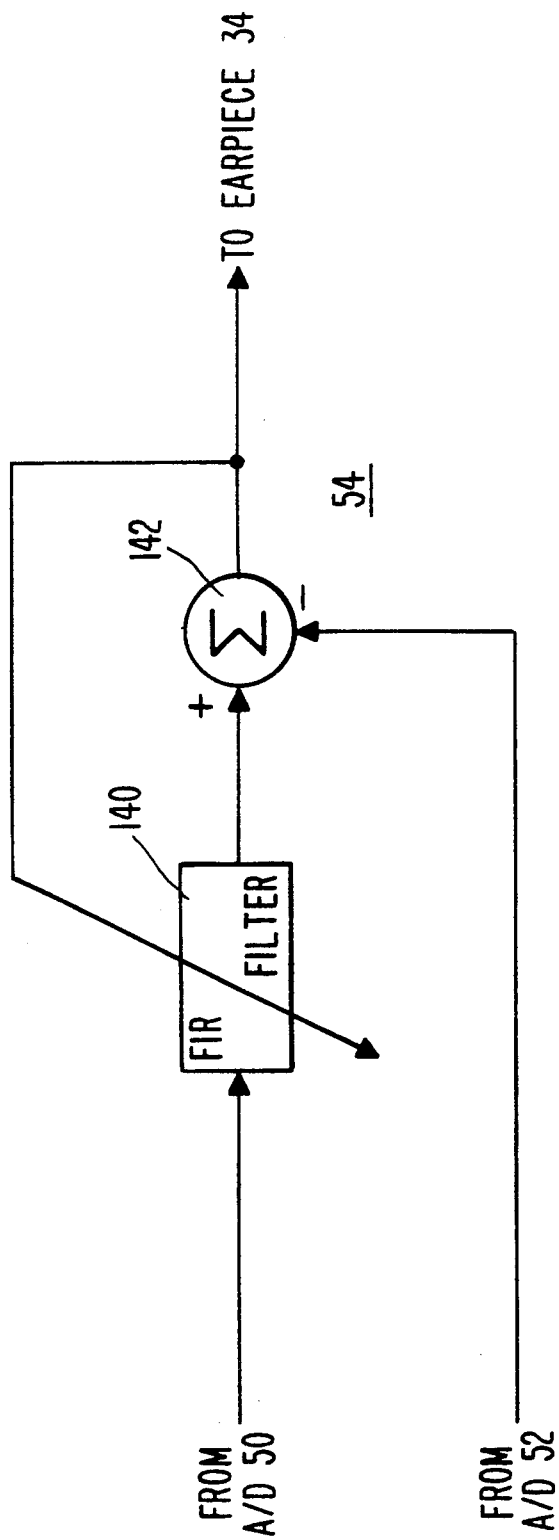
FIG. 7 is a block diagram of the sidetone suppressing means of the station shown in FIG. 2.

Referring now to FIG. 7, the echo canceller 54 is shown in greater detail. In the preferred embodiment, the echo canceller 54 comprises an adaptive finite-input-response filter (FIR) 140 coupled to the first A/D converter 50 for receiving the baseband outgoing voice signal and shifting its magnitude and phase to match the magnitude and phase of the unwanted outgoing voice spectrum received along with the incoming voice signals (as mentioned above). The echo canceller 54 also comprises a signal subtractor 142 coupled to the FIR filter and to the second A/D converter 52 for receiving the incoming voice signals (which include the unwanted outgoing voice signal component) from the second A/D converter 52 and for subtracting the matched outgoing voice signal (generated by the FIR filter 140) from the incoming signals thereby removing the unwanted outgoing voice signal component and preventing local echo (i.e. suppressing sidetone) of the outgoing voice signal. Thus, the difference signal from the subtractor 142 comprises only the incoming voice signals from other stations 12.

Because the impedance looking into the twisted pair (party line) varies from line-to-line and channel-to-channel, the require transfer function of the FIR filter 140 is dependent upon the conferencing channel selected and is never constant. Therefore, the FIR filter 140 must adjust its filter characteristics to achieve the required transfer function. The adjustment is achieved by providing the FIR filter 140 with feedback from the output of the subtractor 142. The FIR filter 140 applies the difference signal from the subtractor 142 to a Normalized Least Mean Squared (NLMS) adaptive algorithm and adjusts its characteristics accordingly.

As indicated in FIG. 7, but as best shown in FIG. 2, the output of the subtractor 142 of the echo canceller 54 is coupled to the earpiece 34 for transmitting the difference signal to the earpiece 34 so that the party at the station 12 may listen to the incoming voice signals.

Referring again to FIG. 1, in page party system use, a paging party at one of the stations 12 desiring to initiate a conferencing call with persons at other stations 12 picks up the handset microphone 32 at his/her station 12, thereby closing the hook switch 24. The paging party then positions switch 22 such that the current source line driver 26 is coupled to the page line 14. By speaking into the handset microphone 32, a paging message is broadcast via speakers 20 located throughout the plant. The paging message will indicate who the paging party desires to speak with as well as the conferencing channel the paging party wishes to use. After delivering the message, the paging party positions the switch 22 such that the current source line driver 26 is coupled to the party line 16 and sets the channel selector switch 38 to the selected conferencing channel.

The paged persons at other stations 12 respond to the paging message by picking up the handset microphones 32 at their respective stations 12 and positioning their respective switches 22 such that they too are connected to the party line 16. Each of the paged persons also sets his/her channel selector switch 38 to the selected conferencing channel. The controller 36 at each station 12 generates a channel selector signal identifying the selected conferencing channel and transmits the signal to the respective voice modem 28.

As each person speaks into his/her handset microphone 32 an outgoing voice signal is generated. The voice modem 28 at each station translates the baseband spectrum of the outgoing voice signal to the frequency band of the selected conferencing channel, as described above. The outgoing voice signals are then transmitted over the party line 16 by the current source line driver 24 at each station 12. By utilizing single sideband techniques and sufficiently attenuating the unwanted sideband, the voice signals are able to be passively summed on the party line 16 at the channel frequency and demodulated non-synchronously.

Simultaneously, the voice modem 28 at each station 12 receives the summed voice signals and translates the spectra of the received voice signals from the conferencing channel frequency back to baseband, as also described above. The received baseband voice signals are then transmitted to the earpiece 34 so that the person at each station 12 may listen.

As a result of the present invention's ability to provide passive summation of the voice spectra at the frequency of the selected conferencing channel, each party may simultaneously speak and listen to each other party. Thus, the page party system 10 of the present invention provides full-duplex conferencing over the selected conferencing channel. Furthermore, other persons may participate in a different conference call simply by selecting a different conferencing channel. The voice spectra of these other persons are translated to a different frequency band, and therefore will not interfere with the voice spectra of the first conference call. As mentioned, in the preferred embodiment, four conferencing channels are provided. Thus, the page party system of the present invention provides multiple full-duplex conference calls over the single party line 16.

From the foregoing description, it can be seen that the present invention comprises a page party system for use in industrial environments, such as power plants, and more specifically, a page party system having a page line and a single party line for providing multiple full-duplex conference calls over the single party line. The present invention provides multiple full-duplex conferencing over the single party-line by combining frequency division multiplexing with single sideband, suppressed carrier amplitude modulation of voice information. It will be appreciated by those skilled in the art, that changes could be made to the embodiment described above without departing from the broad inventive concepts thereof. It is understood, therefore, that this invention is not limited to the particular embodiment disclosed, but is intended to cover all modifications which are within the scope and spirit of the invention as defined by the appended claims.

What is claimed:

1. A page party communication system having a plurality of stations joined by a page line and by a single party line for providing plural full duplex voice conferencing channels on the single party line, each station comprising:

a current source line driver selectively coupled to either the page line for transmitting a paging message or to the party line for transmitting outgoing or receiving incoming voice signals between stations;

a channel selector switch for selecting one of said conferencing channels, each of said conferencing channels having a unique frequency band corresponding thereto;

audio input means for receiving outgoing voice signals;

a voice modem, responsive to said audio input means, including
   (a) means for amplitude modulating a carrier with said outgoing voice signal and for suppressing the carrier and one its sidebands to produce a single sideband suppressed carrier spectrum;
   (b) means for translating that spectrum to the frequency band of the selected conferencing channel;
   (c) means, responsive to said line driver, for receiving single sideband suppressed carrier spectra representing incoming voice signals from other stations on the party line and for translating incoming spectra located at the frequency of the selected channel to baseband; and
   (d) means for suppressing sidetone from incoming voice signals to produce a suppressed sidetone output signal; and means, coupled to the voice modem, for generating an audio output in response to said suppressed sidetone output signal.

2. The page party system of claim 1 in which said voice modem further comprises:

a master clock at each station for generating a master clock signal at that station, the clock at that station being non-synchronous with respect to the clock at each other station.

3. The page party system of claim 2 further comprising:

a controller responsive to the channel selector switch for generating a channel selector signal that uniquely identifies that selected channel.

4. The page party system of claim 3 in which the voice modem further comprises:

a means responsive to the channel selector signal and to the master clock signal for generating a local oscillator signal, the frequency of which varies depending upon the conferencing channel selected, the local oscillator signal being directed to both the means for translating and means for receiving.

5. The page party system of claim 4 in which the means for translating the single sideband suppressed carrier spectrum of the outgoing voice signal further comprises:

a means for modulating the single sideband suppressed carrier spectrum with the local oscillator signal to produce both a lower frequency and higher frequency image of the single sideband suppressed carrier spectrum, at least one of which is within the band of the selected conferencing channel; and a tracking low pass filter means which rejects the image of the single sideband spectrum at one of the frequencies while passing the other, the cut off-frequency of the filter being such as to pass the sideband image within the frequency band of the selected conferencing channel.

6. The page party system of claim 5 in which the lower frequency sideband image is within the frequency band of the selected conferencing channel.

7. The page party system of claim 5 further comprising a means for shifting the single sideband suppressed carrier spectrum of the outgoing voice signal to an intermediate frequency prior to modulation with the local oscillator.

8. The page party system of claim 7 wherein the frequency of the local oscillator is equal to the frequency of the selected conferencing channel plus the intermediate frequency.

9. The page party system of claim 7 wherein the intermediate frequency is 40 KHz.

10. The page party system of claim 7 in which the means for receiving further comprises:

a means for generating a receive local oscillator signal having a frequency corresponding to the selected conferencing channel;

a modulator for modulating the incoming voice spectra with the receive local oscillator signal to produce an image of the received spectra at baseband and an image of the received spectra at a higher frequency; and a low pass filter for rejecting the image of the received spectra at the higher frequency while passing the image of the received spectra at baseband.

11. The page party system of claim 10 wherein the frequency of the local oscillator is equal to the frequency of the selected conferencing channel plus the intermediate frequency and wherein the means for generating a receive local oscillator comprises:

a means for modulating the local oscillator signal with a carrier signal having a frequency equal to the intermediate frequency to produce a higher frequency signal and a lower frequency signal, the lower frequency signal having a frequency equal to the frequency of the selected conferencing channel; and a tracking low pass filter responsive to the channel selector signal for rejecting the higher frequency signal and for passing the lower frequency signal to produce a receive local oscillator signal having a frequency corresponding to the selected conferencing channel.

12. The page party system of claim 5 or 11 further comprising:
   a means responsive to the control means, for determining the cut-off frequency of the tracking low-pass filters depending upon the conferencing channel being selected.

13. The page party system of claim 1 in which said means for amplitude modulating a carrier with said outgoing voice signal and for suppressing the carrier and one its sidebands to produce a single sideband suppressed carrier spectrum further comprises:
   a means for splitting the outgoing voice signal into identical first and second voice signals;
   a means for phase-shifting the first voice signal;
   a first modulator for modulating a cosine-wave carrier signal having a selected frequency with the phase-shifted voice signal, the frequency spectrum of the modulated cosine-wave signal being centered at the carrier frequency and having a lower sideband and an upper sideband, the magnitudes of said sidebands having opposite polarity;
   a second modulator for modulating a sine-wave carrier signal having the selected frequency with the second voice signal, the frequency spectrum of the modulated sine-wave signal being centered at the carrier frequency and having a lower sideband and an upper sideband, the magnitudes of said sidebands having the same polarity; and
   a means coupled to each of the modulators for summing the modulated carrier signals such that at least one of the sidebands of the modulated cosine-wave carrier signals cancels with a corresponding sideband of the modulated sine-wave carrier thereby producing a single sideband suppressed carrier spectrum.

14. The page party system of claim 13 wherein the means for phase-shifting comprises a Hilbert transform filter.

15. The page party system of claim 13 wherein the selected frequency is 8 kHz.

16. The page party system of claim 11 in which said means for amplitude modulating a carrier with said outgoing voice signal and for suppressing the carrier and one its sidebands to produce a single sideband suppressed carrier spectrum comprises:
   a digital signal processor.

17. The page party system of claim 1 in which said means for suppressing sidetone from incoming voice signals to produce a suppressed sidetone output signal further comprises:
   a digital signal processor.

* * * * *